US012632692B2

(12) United States Patent
Mistor

(10) Patent No.: US 12,632,692 B2
(45) Date of Patent: May 19, 2026

(54) LEVERAGING MULTIPLE DISPARATE MACHINE LEARNING MODEL DATA OUTPUTS TO GENERATE RECOMMENDATIONS FOR THE NEXT BEST ACTION

(71) Applicant: Truist Bank, Charlotte, NC (US)

(72) Inventor: Paul Gerard Mistor, Winston-Salem, NC (US)

(73) Assignee: TRUIST BANK, Charlotte, NC (US)

( * ) Notice: Subject to any disclaimer, the term of this patent is extended or adjusted under 35 U.S.C. 154(b) by 958 days.

(21) Appl. No.: 17/806,366

(22) Filed: Jun. 10, 2022

(65) Prior Publication Data

US 2023/0401417 A1    Dec. 14, 2023

(51) Int. Cl.
*G06N 3/006* (2023.01)
*G06N 3/044* (2023.01)
*G06N 3/08* (2023.01)

(52) U.S. Cl.
CPC ............. *G06N 3/006* (2013.01); *G06N 3/044* (2023.01); *G06N 3/08* (2013.01)

(58) Field of Classification Search
CPC .......... G06N 3/006; G06N 3/044; G06N 3/08
See application file for complete search history.

(56) References Cited

U.S. PATENT DOCUMENTS 10,187,337 B2    1/2019   Smullen
10,361,975 B2    7/2019   Borsutsky

| 10,757,044 | B2 |   | 8/2020 | Fawcett | |
|---|---|---|---|---|---|
| 10,825,073 | B1 | * | 11/2020 | Walters | ................. G06N 5/046 |
| 10,841,250 | B2 |   | 11/2020 | Borsutsky | |
| 11,145,302 | B2 |   | 10/2021 | Byon | |
| 11,159,457 | B2 |   | 10/2021 | Liang | |
| 11,184,298 | B2 |   | 11/2021 | Freed | |
| 11,271,877 | B2 |   | 3/2022 | Goyal | |
| 11,381,682 | B2 |   | 7/2022 | Matula | |
| 11,657,797 | B2 |   | 5/2023 | Vishnoi | |
| 11,659,086 | B2 |   | 5/2023 | Matula | |
| 11,922,123 | B2 |   | 3/2024 | Vishnoi | |
| 11,928,430 | B2 |   | 3/2024 | Pan | |
| 12,190,066 | B2 |   | 1/2025 | Goyal | |
| 12,198,074 | B2 |   | 1/2025 | Yannam | |
| 12,323,372 | B2 |   | 6/2025 | Kim | |

(Continued)

*Primary Examiner* — Sherrod L Keaton

(74) *Attorney, Agent, or Firm* — Michael A. Springs, Esq.; Shumaker, Loop & Kendrick, LLP; Patrick B. Horne

(57) ABSTRACT

A system monitors signals in a service context specific channel (SCS) among multiple SCS channels and sends an advisory message when discharges are disproportionate with respect to a peer-representative index (PRI). The system monitors signals in multiple bidirectional SCS channels between multiple system devices and at least one user device, each SCS channel conveying signals to and from a respective system device of the multiple system devices. The system identifies discharges to a third party from an account associated with the user, determines the discharges are disproportionate relative to the PRI, and generates an advisory message regarding disproportionate discharges for at least one SCS channel. The advisory message is sent via the at least one SCS channel to at least one of the user device and the system device of the at least one SCS channel. Advisory messaging may be sent directly to client device, or indirectly via system agents.

20 Claims, 9 Drawing Sheets

(56)     References Cited

U.S. PATENT DOCUMENTS

| | | | |
|---|---|---|---|
| 12,407,632 B2 | 9/2025 | Schuetz | |
| 2015/0269545 A1* | 9/2015 | Epler ................... | G06Q 20/108 |
| | | | 705/42 |
| 2017/0180284 A1 | 6/2017 | Smullen | |
| 2018/0054523 A1 | 2/2018 | Zhang | |
| 2018/0102989 A1 | 4/2018 | Borsutsky | |
| 2018/0337872 A1 | 11/2018 | Fawcett | |
| 2019/0188788 A1* | 6/2019 | Baker, IV ............ | G06T 19/006 |
| 2019/0199658 A1 | 6/2019 | Kim | |
| 2019/0267001 A1 | 8/2019 | Byun | |
| 2019/0356613 A1 | 11/2019 | Borsutsky | |
| 2020/0142719 A1 | 5/2020 | Akbulut | |
| 2020/0294101 A1 | 9/2020 | Bell | |
| 2020/0342850 A1 | 10/2020 | Vishnoi | |
| 2021/0067470 A1 | 3/2021 | Freed | |
| 2021/0083994 A1 | 3/2021 | Pan | |
| 2021/0144107 A1 | 5/2021 | Liang | |
| 2021/0359961 A1 | 11/2021 | Matula | |
| 2021/0360106 A1 | 11/2021 | Matula | |
| 2022/0021630 A1 | 1/2022 | Goyal | |
| 2022/0100961 A1 | 3/2022 | Vishnoi | |
| 2022/0272054 A1 | 8/2022 | Gao | |
| 2022/0351058 A1 | 11/2022 | Yannam, Jr. | |
| 2023/0244877 A1 | 8/2023 | Goyal | |
| 2023/0267227 A1* | 8/2023 | Ghatage ............. | G06F 21/6245 |
| | | | 726/26 |
| 2023/0412530 A1 | 12/2023 | Schuetz | |

* cited by examiner

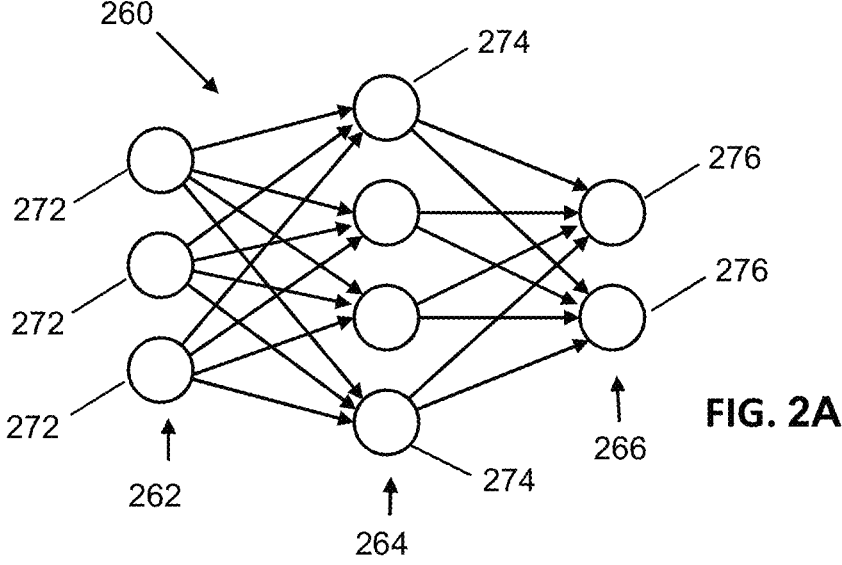
FIG. 2A
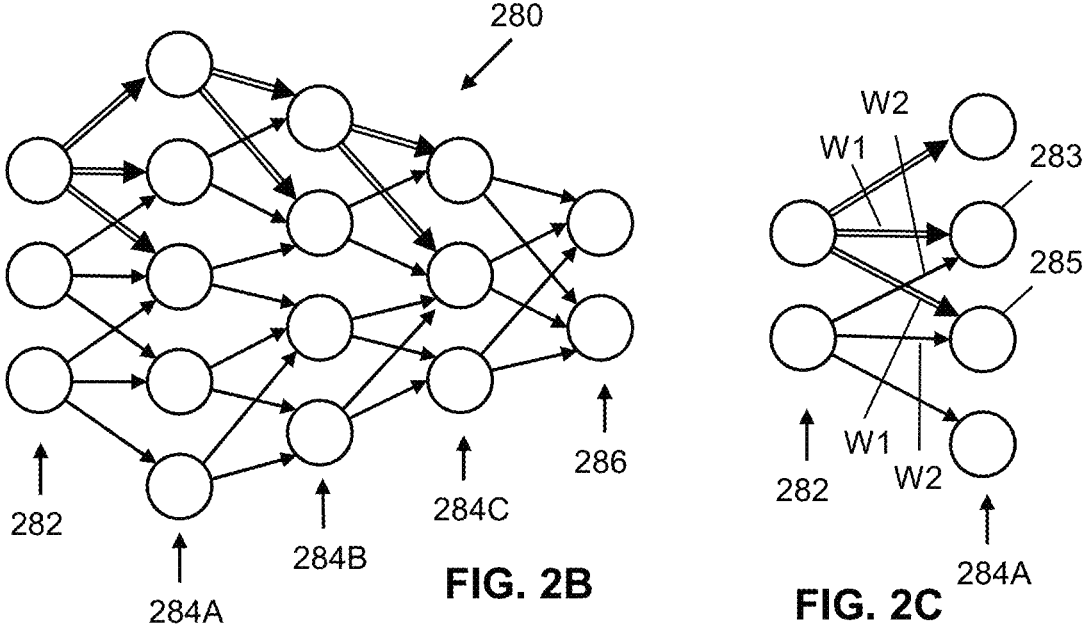
FIG. 2B
FIG. 2C

LEVERAGING MULTIPLE DISPARATE MACHINE LEARNING MODEL DATA OUTPUTS TO GENERATE RECOMMENDATIONS FOR THE NEXT BEST ACTION

FIELD

This invention relates generally to the field of prioritizing messaging multi-channel network or system, and more particularly embodiments of apparatuses and methods that monitor signals for disproportionately high values and send advisories of same.

BACKGROUND

Many user entities and their service providers are unaware of high-level patterns in their data flows. Conventional paper flow handling of information and resources has been largely replaced by use of computerized data storage and digital transactions. This opens opportunities for informatics previously unavailable, particularly for example through machine learning and artificial intelligence (AI).

User entities may or may not be aware of what subjects are most significant in their transactional flows and communications. Where some awareness is present, metrics for quantizing what matters are critical or highest priority are not readily available. Lack of such information may prevent users from effectively using time, opportunities, and resources.

User entities are typically unaware of whether their spending diverges from that of their peers because transactional automated analytics is not generally available. User entities may be disadvantaged by the proprietary and private handling of payments for costs and resources, leaving users in a common industry and/or area unaware of whether their expenditures in common categories are exceeding average or peer-representative levels. Lack of such information may prevent users from negotiating fair prices for resources and services.

Improvements are needed toward determining priorities and a next best action across multiple channels of communications and service. Improvements are needed toward utilizing transactional data flows and records to alert user entities to any disproportionate spending in categorized spending categories relative to peer-representative amounts.

BRIEF SUMMARY

Embodiments of the present invention address the above needs and/or achieve other advantages by providing apparatuses and methods that monitor signals for spurious discharges. In at least one embodiment, a system is provided for monitoring signals in a service context specific channel (SCS) among multiple SCS channels and sending an advisory message when discharges are disproportionate with respect to a peer-representative index (PRI). The system includes at least one processor, a communication interface communicatively coupled to the at least one processor, and a memory device storing executable code. When executed by the memory device that, the at least one processor is caused to monitor signals in multiple bidirectional SCS channels between multiple system devices and at least one user device, each SCS channel conveying signals to and from a respective system device of the multiple system devices.

The at least one processor further identifies discharges to a third party from an account associated with the user device. The at least one processor further determines the discharges are disproportionate with respect to a PRI. The at least one processor further generates an advisory message regarding the disproportionate discharges for at least one SCS channel. The at least one processor further sends the advisory message via the at least one SCS channel to at least one of the user device and the system device of the at least one SCS channel.

In some examples, at least one system device communicates, via one or more of the SCS channel, with a user of the at least one user device via a virtual agent using conversational artificial intelligence (AI).

The at least one processor may execute a machine learning algorithm configured to guide, via the one ore more SCS channel, dialog or actions during a phone call or a chat session with a user concerning a user matter via the virtual agent using the conversational artificial intelligence (AI).

The phone call or the chat session may transpire between the user device and the at least one system device over a network connection via the communication interface. The user device may be one of a mobile phone, a non-mobile phone, a tablet device, a computer or a display screen with a virtual or physical keyboard.

The virtual agent may conduct the phone call or a chat session with the user by steps including asking an initial question of the user and receiving a response from the user. The virtual agent may then determine a next question to ask of the user or a next action to take based on the response. The virtual agent may then connect a human agent into the phone call or the chat session when connecting the human agent is determined as the next action.

In various examples, via each of the multiple SCS channels, at least one system device communicates with a user of the at least one user device via a respective human agent or virtual agent using conversational artificial intelligence (AI). The advisory message guides the human agent or virtual agent of the at least one SCS channel in a system-wide next dialog with the user.

The executable code, when executed, further causes the at least one processor to send at least a notification of the sent advisory message to each respective system device of the multiple SCS channels other than the at least one SCS channel.

Sending at least the notification to each of the multiple SCS channels other than at least one SCS channels prevents repetitive dialogs with the user regarding a topic of the advisory message.

The bidirectional SCS channels conduct respective dialogs between at least one system device and at least one user device.

The respective dialogs are conducted, at least in part, non-concurrently, and at least some of the dialogs are conducted intermittently.

Each dialog conducted intermittently may be conducted via SMS, text, email, or app push notification.

In at least one embodiment, a system for monitoring signals in a service context specific channel (SCS) among multiple SCS channels and sending an advisory message when discharges are disproportionate with respect to a peer-representative index (PRI).

The system includes at least one processor, a communication interface communicatively coupled to the at least one processor, and a memory device storing executable code. When executed by the memory device that, the at least one processor is caused to monitor signals in multiple bidirectional SCS channels between multiple system devices and at least one user device, each SCS channel conveying signals to and from a respective system device of the multiple system devices. The at least one processor further identifies, using an algorithm trained by a machine-learning technique, discharges to a third party from an account associated with the user device. The at least one processor further determines the discharges are disproportionate with respect to a PRI. The at least one processor further generates an advisory message regarding the disproportionate discharges for at least one SCS channel. The at least one processor further sends the advisory message via the at least one SCS channel to at least one of the user device and the system device of the at least one SCS channel.

In various examples, via each of the multiple SCS channels, at least one system device communicates with a user of the at least one user device via a respective human agent or virtual agent using conversational artificial intelligence (AI). The advisory message guides at least one of the user and the human agent or virtual agent in a system-wide next dialog with the user.

In at least one example, the executable code, when executed, further causes the at least one processor to send at least a notification of the sent advisory message to each respective system device of the multiple SCS channels other than the at least one SCS channel.

In at least one example, sending at least the notification to each of the multiple SCS channels other than at least one SCS channels prevents repetitive dialogs with the user regarding a topic of the advisory message.

In at least one example, the at least one processor executes a machine learning algorithm configured to guide, via the at least one SCS channel, dialog or actions during a phone call or a chat session with a user concerning a user matter via the virtual agent using the conversational artificial intelligence (AI).

In at least one example, the phone call or the chat session transpires between the user device and the at least one system device over a network connection via the communication interface. The user device can be one of a mobile phone, a non-mobile phone, a tablet device, a computer or a display screen with a virtual or physical keyboard.

The virtual agent conducts the phone call or a chat session with the user by steps including asking an initial question of the user and receiving a response from the user. The virtual agent determines a next question to ask of the user or a next action to take based on the response. The virtual agent connects a human agent into the phone call or the chat session when connecting the human agent is determined as the next action.

In at least one embodiment, a method is provided for determining, by a computing system, a priority service context specific (SCS) channel among multiple SCS channels according to a priority status metric (PSM) and sending an advisory message thereto. The system includes at least one processor, a communication interface communicatively coupled to the at least one processor, and a memory device storing computer-readable instructions, the at least one processor configured to execute the computer-readable instructions. The method includes, upon execution of the computer-readable instructions by the at least one processor, monitoring signals in multiple bidirectional SCS channels between multiple system devices and at least one user device, each SCS channel conveying signals to and from a respective system device of the multiple system devices. The method includes identifying, using an algorithm trained by a machine-learning technique, discharges to a third party from an account associated with the user device. The method includes determining the discharges are disproportionate with respect to a PRI. The method includes generating an advisory message regarding the disproportionate discharges for at least one SCS channel. The method includes sending the advisory message via the at least one SCS channel to at least one of the user device and the system device of the at least one SCS channel. Via each of the multiple SCS channels, at least one system device communicates with a user of the at least one user device via a respective human agent or virtual agent using conversational artificial intelligence (AI). The advisory message guides at least one of the user and the human agent or virtual agent in a system-wide next dialog with the user.

The method may include sending at least a notification of the sent advisory message to each respective system device of the multiple SCS channels other than the at least one SCS channel.

Sending at least the notification to each respective system device of the multiple SCS channels other than the at least one SCS channel prevents repetitive dialogs with the user regarding the disproportionate discharges.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
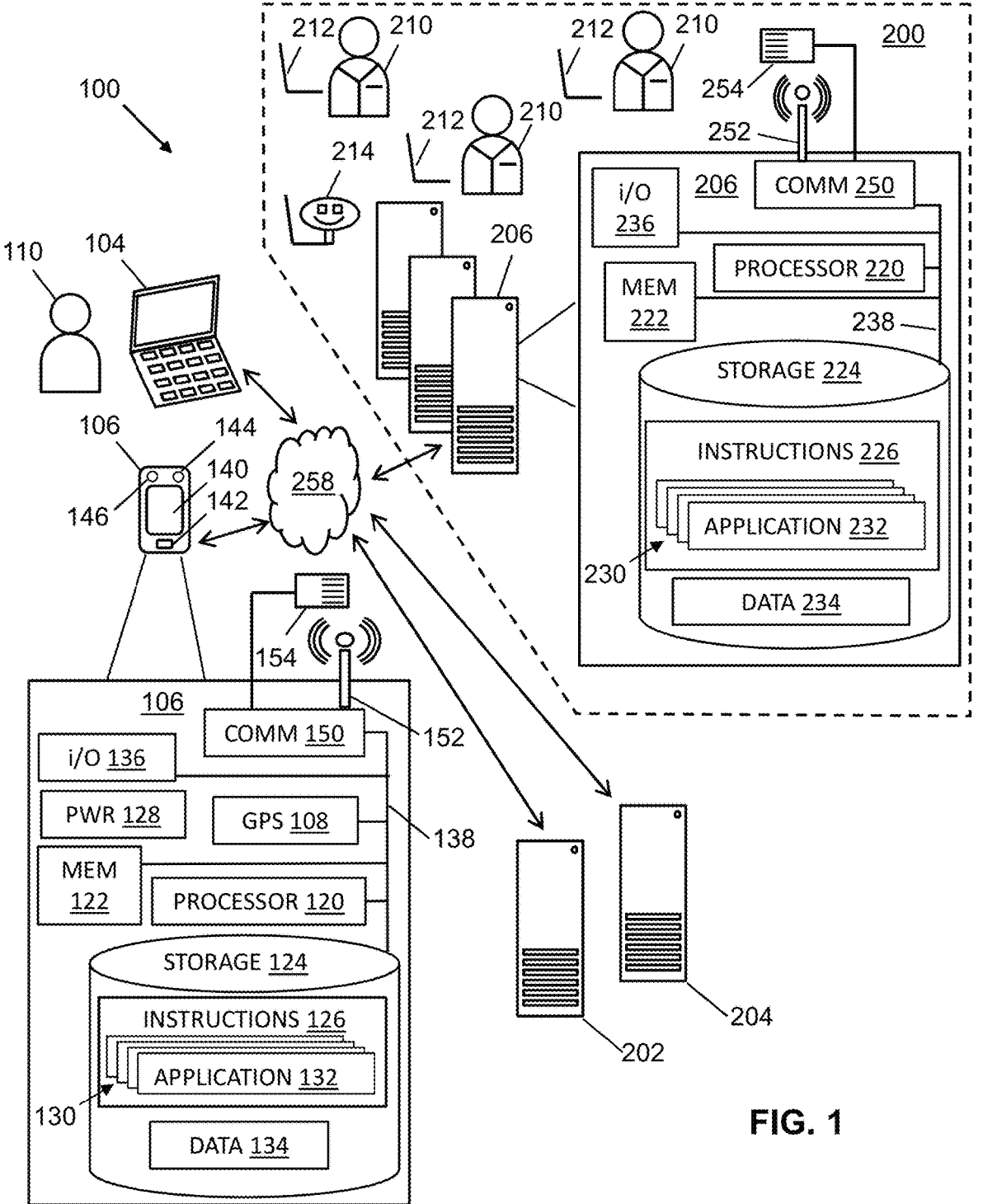

Having thus described embodiments of the invention in general terms, reference will now be made to the accompanying drawings, wherein:

FIG. 1 illustrates an enterprise system, and environment thereof, according to at least one embodiment.

FIG. 2A is a diagram of a feedforward network, according to at least one embodiment, utilized in machine learning FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

Figure 3:
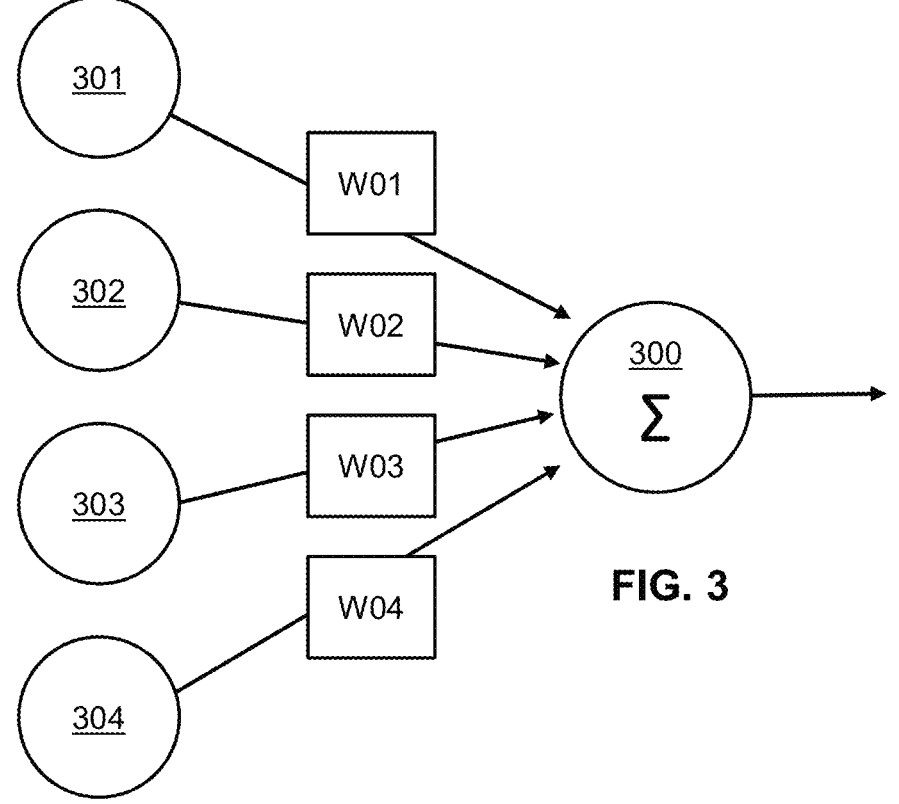

FIG. 3 is a diagram representing an exemplary weighted sum computation in a node in an artificial neural network.

Figure 4:
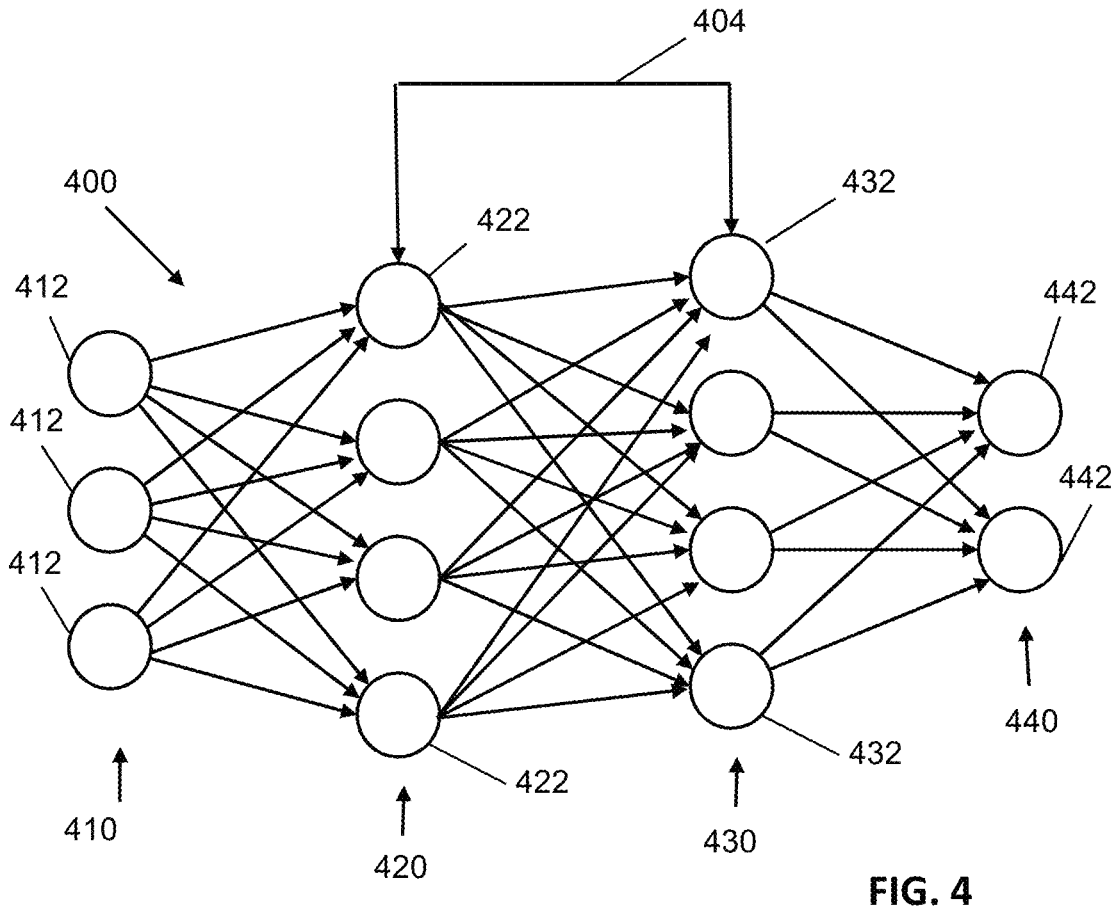

FIG. 4 is a diagram of a Recurrent Neural Network RNN, according to at least one embodiment, utilized in machine learning.

Figure 5:
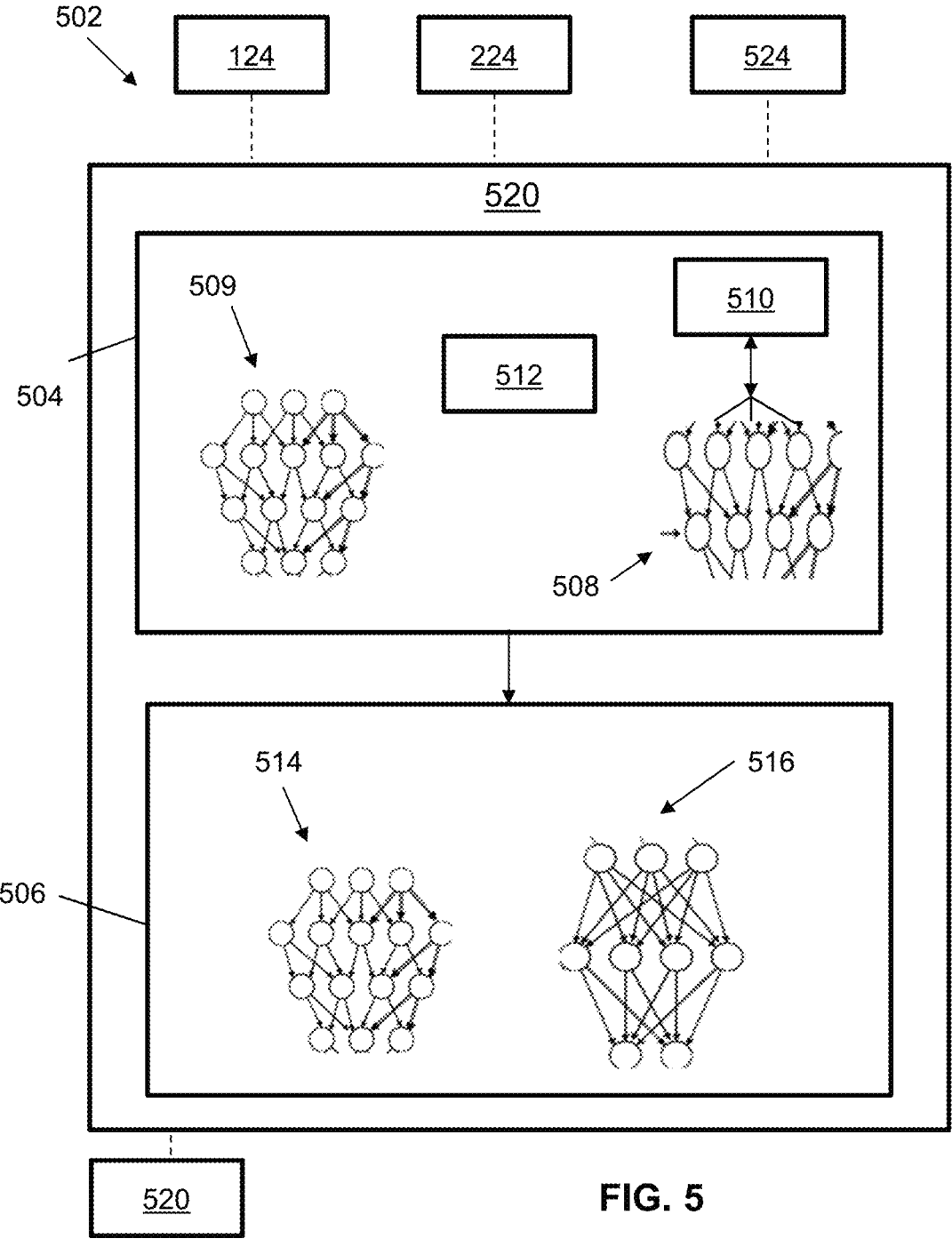

FIG. 5 is a schematic logic diagram of an artificial intelligence program including a front-end and a back-end algorithm.

Figure 6:
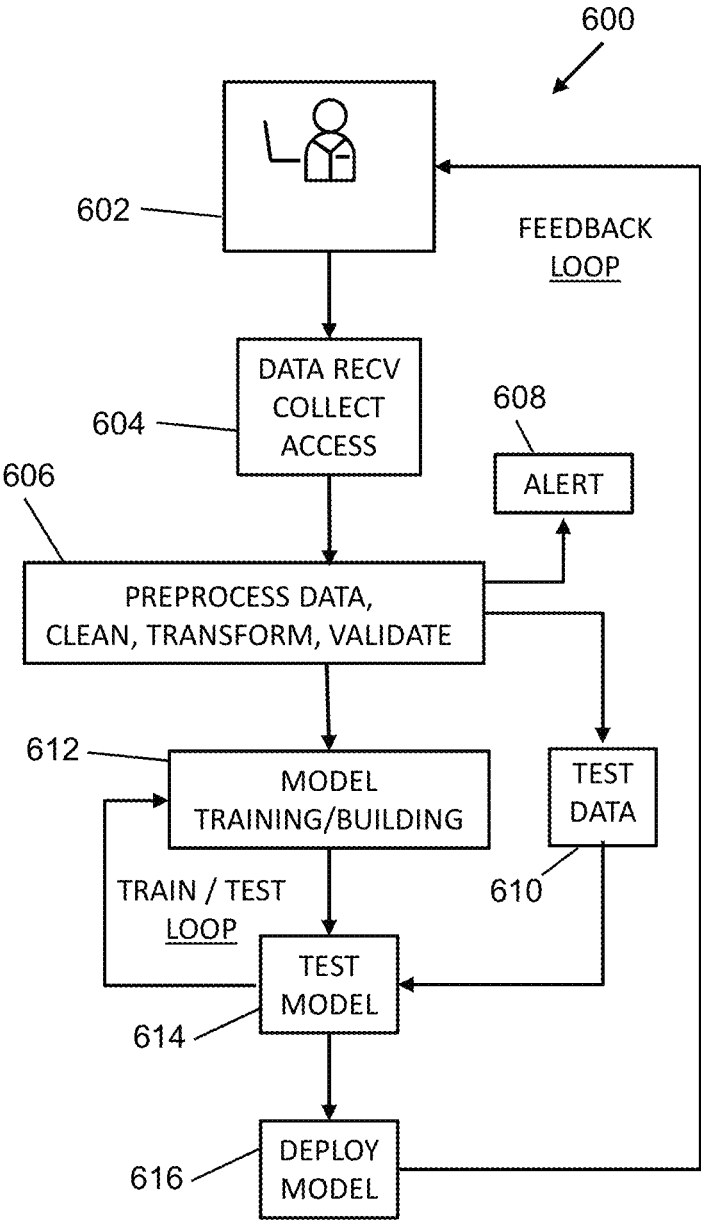

FIG. 6 is a flow chart representing a method, according to at least one embodiment, of model development and deployment by machine learning.

Figure 7:
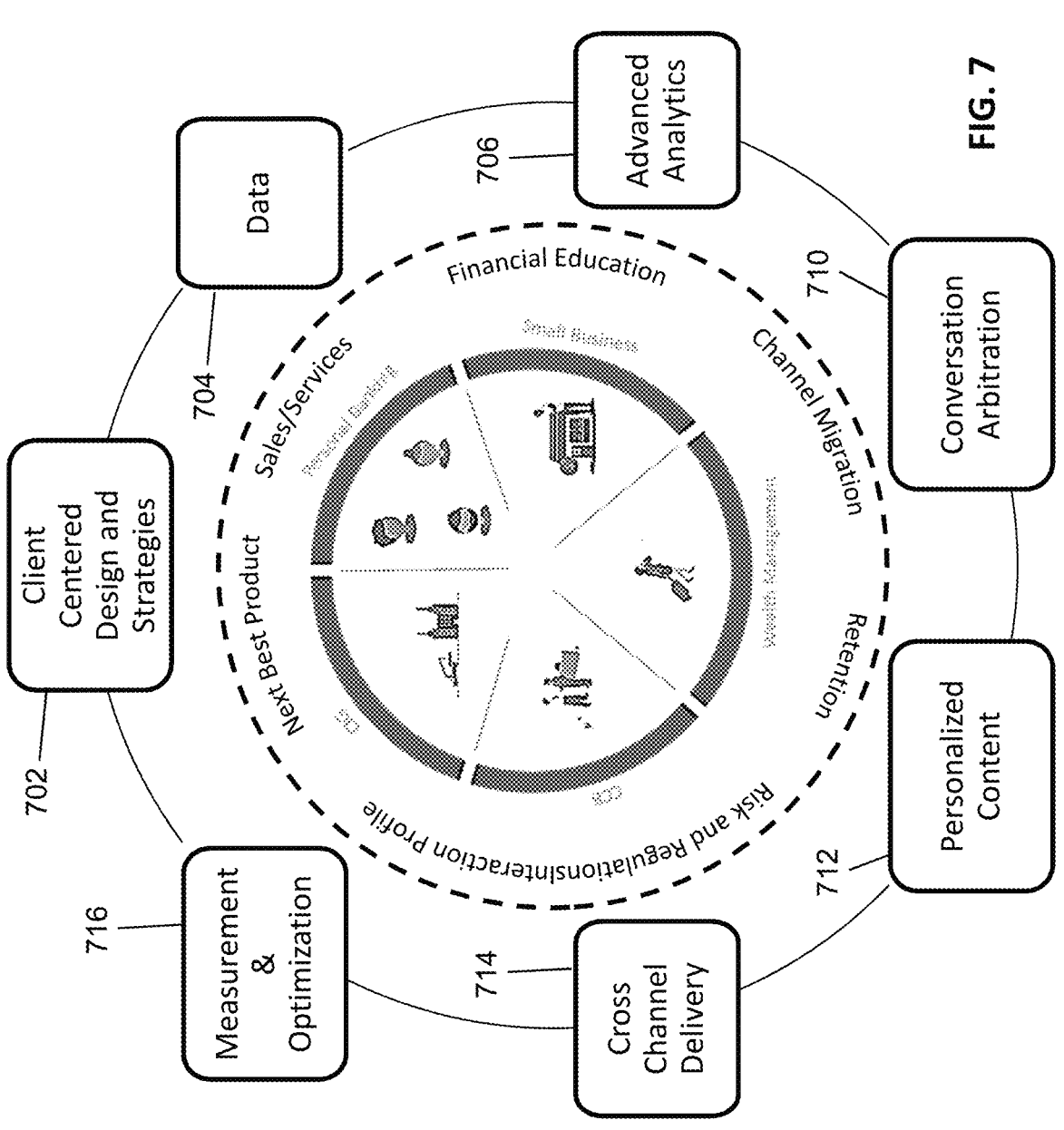

FIG. 7 represents methodology and systems by which a service entity achieves hyper-personalization to provide services, products, and options to users.

Figure 8:
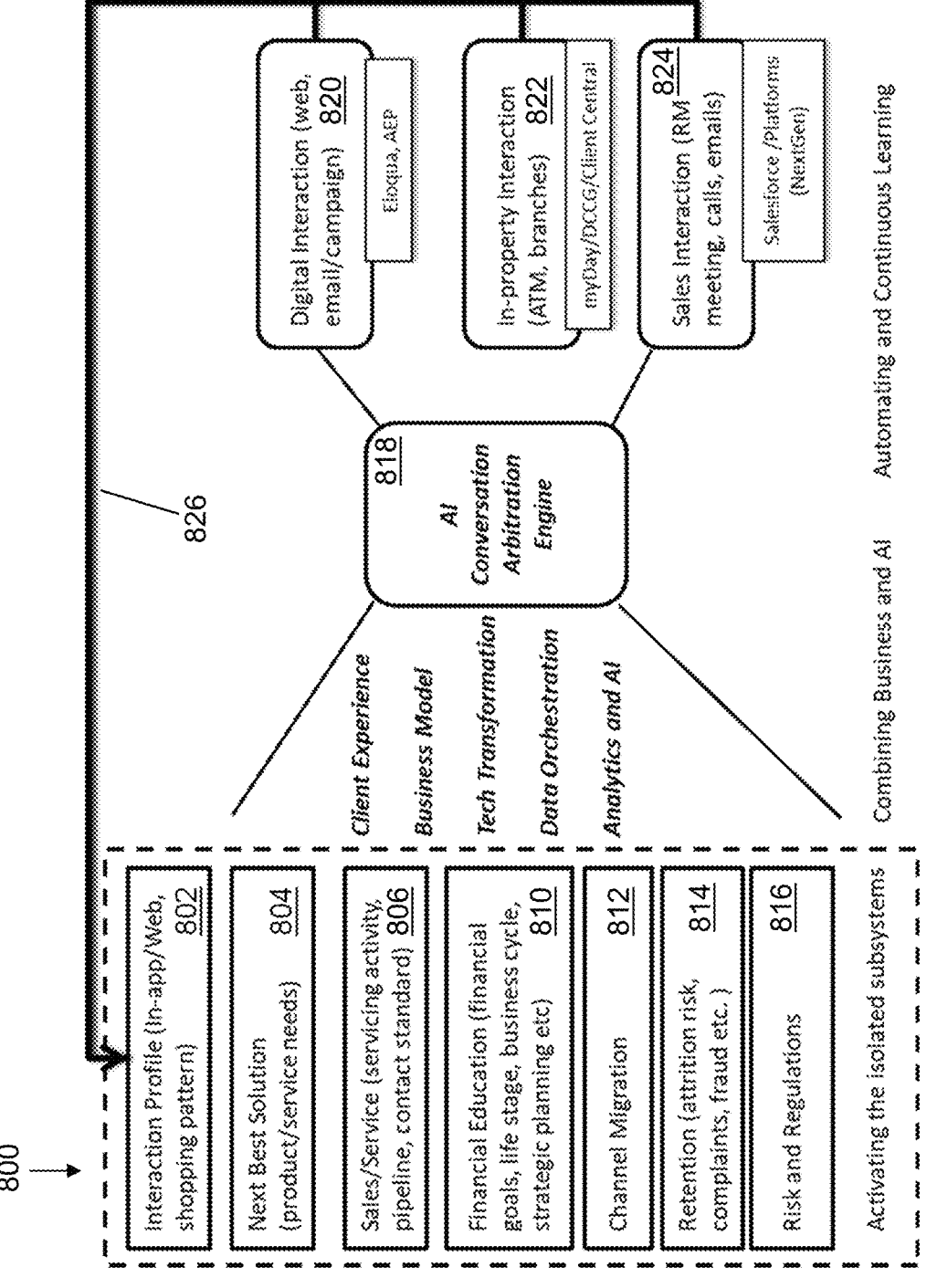

FIG. 8 shows an informatics loop and arbitration engine by which next best action methods and systems combine business sense, technology and AI to drive advisory messages for a hyper-personalized client experience.

Figure 9:
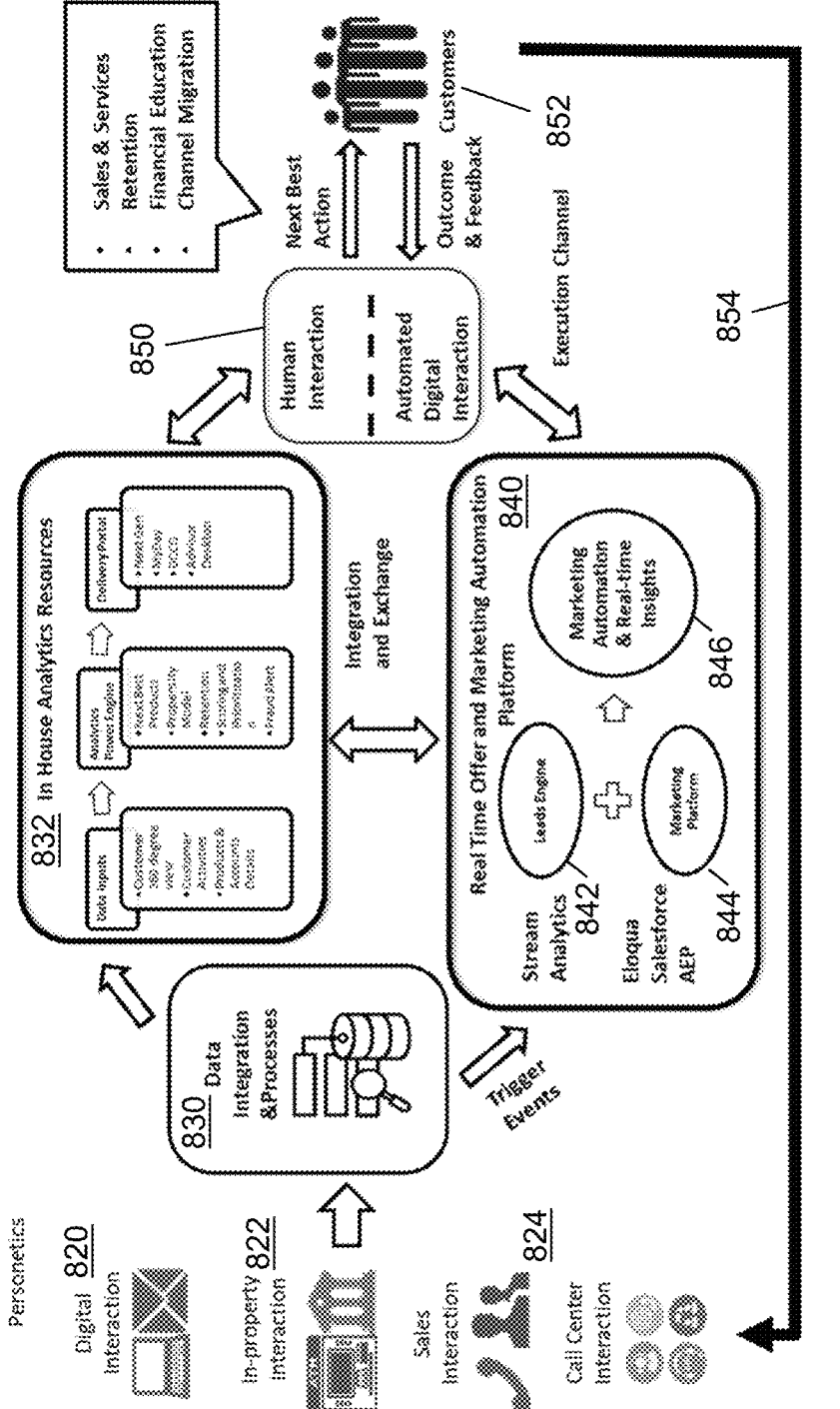

FIG. 9 further represents implementation of digital and personal interactions for a hyper-personalized client experience.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

In various system and methods according to embodiments expressly described herein and those inferred therefrom, a next best action is determined for guiding dialogs between the service entity and users seeking or in need of products and services thereof.

The service entity has developed business rules and outcomes that focus on client needs and focus on client success in implementing client centered design strategies, referenced as 702 in FIG. 7. Embodiments of systems and methods described herein ethically use the large data resources 704 about our clients to create trustworthy recommendations deepen client relationship in a cycle, illustrated as a circle in FIG. 7, of hyper-personalization to provide services, products, and options to users. Advanced analytics 706 are used to leverage machine learning and AI to optimize product, client and network opportunities. By conversation arbitration 710, a next best action, which may for example include conversation of offering, is chosen for clients and agents, virtual or human, in the interest of achieving user goals.

Personalized content 712 is relevant and inspiring to client specific situations and needs. Cross channel delivery 714 assures the right message, right channel, and right time for clients. Measurement and optimization 716 refers to measuring outcomes from client, sales, marketing and digital perspective.

According to such embodiments, and with reference at least to FIG. 8, the next best action methods and systems combine business sense, technology and AI to drive advisory messages for a hyper-personalized client experience. The service entity manages subsystems 800, including user interaction profiles 802, products and service needs 804, sales and service activities 806, financial education 810, channel migration 812 retention 814, and risks and regulations 816. These managed records, services, and user concerns are active as isolated subsystems, each for example with a dedicated communication channel and assigned agents, which may be human agents, virtual agents, and combinations thereof.

An artificial intelligence (AI) conversation arbitration engine 818 combines outcomes and factors, such as client experience, business models, tech transformation, and data orchestration, analytics and AI to generate and/or offer at least digital interaction 820, in-property interaction 822, sales interaction 824. The engine 802 thus combines business and AI, and service to automate continuous learning, with reference to the return channel 826, by which the referenced subsystems 800 are updated and utilized again by the engine 808 in an ongoing machine learning process by which communication with clients are managed, assisted, or advised.

As further represented by illustration in FIG. 9, digital interaction 820 can include online sessions, email, and even automated or semi-automated sent physical mail. In-property interaction 822 can include visits to ATMs and branch locations. Sales interaction 824 can include call center interactions, as a non-limiting example. These interactions are subject to data integration and processes 830 to or by which further in house analytics resources are applied including data inputs. an analytics power engine, and a delivery portal.

The data integration and processes 830 may trigger events in a real time offer and marketing automation platform 840. A leads engine 842 and marketing platform 844 together can generate marketing automation and real-time insights 846. The represented processes and systems features culminate in client-directed execution channels of communication and interactions 850, including interactions with human agents and automated digital interactions. Next best action approach realization and delivery can be conducted, for example by way of client-direction advisory messaging toward customers 852, directly or via human agents and/or virtual agents. The represented processes and systems can function in a feedback loop fashion, as represented by the return channel 854.

To implement the above-described benefits, advantages, and functions, a system is provided for monitoring signals in a service context specific channel (SCS) among multiple SCS channels and sending an advisory message when discharges are disproportionate with respect to a peer-representative index (PRI). The system, with reference at least to the enterprise system 200 as a non-limiting example, the includes at least one processor 220, a communication interface 250 communicatively coupled to the at least one processor, and a memory device (220, 254) storing executable code.

When executed by the memory device that, the at least one processor is caused to monitor signals in multiple bidirectional SCS channels between multiple system devices and at least one user device, each SCS channel conveying signals to and from a respective system device of the multiple system devices.

An SCS channel can convey communication between the user 110 and enterprise system 200, in non-limiting examples, regarding any of the above described "services and products" and/or combinations thereof. Each channel thus may have a context range separate from or overlapping with other channels. For example, one SCS channel may regard checking services, another may regard credit card services, and yet another may regard mortgage services.

The at least one processor further identifies discharges to a third party from an account associated with the user device. The at least one processor further determines the discharges are disproportionate with respect to a PRI. The at least one processor further generates an advisory message regarding the disproportionate discharges for at least one SCS channel. The at least one processor further sends the advisory message via the at least one SCS channel to at least one of the user device and the system device of the at least one SCS channel.

In various example, the bidirectional SCS channels conduct respective dialogs between at least one system device and at least one user device. The respective dialogs may be conducted, at least in part, non-concurrently, and at least some of the dialogs are conducted intermittently. For example, real-time voice communications with a particular user conducted via phone by a human agent or a virtual agent in one SCS channel, representing a service or product department in the financial institution or bank example, are not conducted concurrently with a human agent or a virtual agent in that SCS channel or another SCS channel with that particular user.

The above-described benefits and advantages are provided in various embodiments of the enterprise system 200 of FIG. 1, which can be described as a monitoring and further identifying discharges to a third party from an account associated with the user device. In various embodiments, steps implemented by the system 200, include: storing input event records associated with the specific user entity, each of the input event records representing a respective quantized input event; and fetching, for at least some of the input event records, a respective input quantity to one or more resource of the specific user entity. Business revenues and personal income being deposited represent quantized input events for which corresponding input quantities are fetched from sources for deposit into one or more user account, for which records are stored with regard to the accounts to which the input quantities are fetched. Output events and records thereof are associated with the specific user entity, each of the output event records representing a respective quantized output event for which discharges refer to expenditures, payments and/or deductions to satisfy cost-related payments, referring to the satisfaction of outgoing checks, incoming debit card charges, credit card charges, and other payments made by or on behalf of the user entity 110 in covering costs. The discharges or payments are typically made to third parties and tendered by the service entity from user resources such as checking, credit and other accounts.

A user entity, as defined above in non-limiting examples, may be subject to multiple cost categories, such as costs for material supplies, utilities like power and water, maintenance and repairs, transportation costs, advertising, payroll for employees, travel, health insurance premiums and other medical-related expenditures, costs for training or education, meals, clothing, communication costs such as for mobile phones, media subscription, club memberships, and more. Each of these incur expenditures that can be paid via, for example, discharges from user accounts by way of checks drafted by the user entity, whether checks be in paper form or electronic. The expenditures can be paid by discharges from user accounts referring to credit cards, and debit cards, and other payment types. These and other transactions can be conducted, for example, online using user devices, represented as a computing device 104 and a mobile device 106 in FIG. 1.

A peer-representative index (PRI) represents peer spending, for example in a particular category, and serves as a basis by which a determination can be made as to whether discharges are disproportionate with respect to a standard, which indicates a user entity is overspending, for example in a cost category. The PRI may include or represent an average, a mean, a normalized sum, and/or a weighted sum, as non-limiting examples. Thus, user entity exposure to category-specific overspending may be mitigated by an advisory message. The advisory message is advantageous to user entities and user devices, enabling early action to be taken by the user entity.

In a non-limiting example provided for illustration, a user entity may be spending disproportionate amounts in a monthly cost pattern, such as mobile phone data usage, and may be alerted to that by way of the advisory message, which may be sent to a user device and/or may be sent to a system device for action by a system agent, such as a human agent or virtual agent. When directed to the system agent, the advisory message conveys, prompts, or relates to a next best action by system agents. The next best action may entail informing the user entity of a rising issue and/or may include offering a solution. In the example of over-expenditures for categorized spending, offering a solution can include information regarding lower costs for same category service. For example, over-spending for phone usage detected by a banking service entity that has user accounts from which payment are made may result in the service entity advising one or more users of lower-cost phone service providers.

The PRI for any or all cost or output categories may be determined by the computing system, in whole or in part, from the transactional data available from the multiple user entities which records are stored by the service entity. The computing system can aggregate over time, for any given output category with which output event records of multiple user-entities are associated, the peer-representative output-category index. For any output category, some output categories, or all output categories, other available data may be used in lieu of or in combination with the transactional data available from the multiple user entities for which records are stored by the service entity. Industry-reported or published data may be made available such that for example, published peer-representative averages and indexes may be used to supplement user data. Thus, the computing system can access and utilize other-party data in determining the peer-representative output-category index.

In at least some examples, the computing system 206 aggregates over time a PRI using an aggregating algorithm trained by a machine-learning technique, for example as represented in FIG. 6. In at least one example, the machine-learning technique utilizes records, of multiple user entities, from prior time intervals to calculate the peer-representative output-category index. A trained model, in at least one embodiment, is built using historical data of the user entity and that of other user entities. The machine-learning technique can be applied to any of the simulated neural network architectures described here with reference to FIGS. 2A-5 for implementation in calculations of a PRI.

Model training can be implemented in FIG. 6 using data from multiple user entities to train a model by which user spending in multiple output categories can be compared to respective peer-spending amounts. An aggregating algorithm may aggregate the PRI from the output event records of the multiple user-entities from at least one time period preceding said time interval. The output event records of multiple time periods may be used in order to implement normalization against spurious market increases and decreases. A PRI may be specific to a geographical location of the specific user entity.

Each dialog of the dialogs conducted intermittently may be conducted via SMS, text, email, or app push notification. In such examples, communications need not be conducted in real time and may thus overlap in their duration.

In some examples, at least one system device 206 communicates, via at least one of the SCS channels, with a user of the at least one user device (104, 106) via a virtual agent 214 using conversational artificial intelligence (AI).

The at least one processor 220 may further execute a machine learning algorithm configured to guide, via at the at least one SCS channel, dialog or actions during a phone call or a chat session with a user concerning a user matter via the virtual agent using the conversational artificial intelligence (AI).

The phone call or the chat session may transpire between the user device and the at least one system device over a network connection via the communication interface. The user device, in non-limiting examples, can be one of a mobile phone, a non-mobile phone, a tablet device, a computer or a display screen with a virtual or physical keyboard.

The virtual agent 214 may conduct the phone call or a chat session with the user by steps including asking an initial question of the user and receiving a response from the user, the question and response being referred to, in some examples, as signals respectively directed toward the user and the agent in a bidirectional SCS channel. The signals may be, for example, in voice or text format.

The virtual agent the determines a next question to ask of the user or a next action to take based on the response; and connects a human agent into the phone call or the chat session when connecting the human agent is determined as the next action. The human agent may be provided a transcript of the signals In at least one example of the system, via each of the multiple SCS channels, at least one system device communicates with a user of the at least one user device via a respective human agent or virtual agent using conversational artificial intelligence (AI), and wherein the advisory message guides the human agent or virtual agent of the SCS channel where one or more disproportionate discharges are determined in a system-wide next dialog with the user. A notification of or about the sent advisory message may be sent to each of the multiple SCS channels other than the SCS channel of the disproportionate discharges to prevent repetitive dialogs with the user regarding a topic of the advisory message. Sending at least the notification to each of the multiple SCS channels other that SCS channels prevents repetitive dialogs with the user regarding a topic of the advisory message. This reduces data trafficked across networks, conserves network resources, improves communication networks and systems efficiencies, and minimizes latencies and needless redundancies, to reduce costs, and to lower energy consumption.

Thus, in an example where the SCS channels are related to respective product or service categories of a service entity such as a financial institution or bank, the product service categories may be offered by respective departments having respective human agents and/or virtual agents. By making all departments aware of the upcoming or recently delivered advisory messaging, a user is not contacted excessively regarding a priority concern.

In various example, the bidirectional SCS channels conduct respective dialogs between at least one system device and at least one user device. The respective dialogs may be conducted, at least in part, non-concurrently, and at least some of the dialogs are conducted intermittently. For example, real-time voice communications with a particular user conducted via phone by a human agent or a virtual agent in one SCS channel, representing a service or product department in the financial institution or bank example, are not conducted concurrently with a human agent or a virtual agent in that SCS channel or another SCS channel with that particular user.

Each dialog of the dialogs conducted intermittently may be conducted via SMS, text, email, or app push notification. In such examples, communications need not be conducted in real time and may thus overlap in their duration.

An advisory message as described herein may provide information regarding frequent overdrafts and how to reduce overdrafts, information to assist a user to better manage finances and reduce fees, and may provide analytics regarding transactions. Communication sessions via respective SCS channels can seamlessly transition from virtual agents to human agents. Human agents joining or replacing another human agent or virtual agent, in some embodiments of systems and methods herein, are provided transcripts or summary transcripts, for example prepared by automatic recognition of keywords relating to client concerns, particular actions, or categories of products and services. Machine learning and/or AI may be implemented, for example using voice recognition or subject recognition, to prepare transcripts of arrive at determinations of a next best action. In an illustrating example, an AI functioning system or device skims phone conversation for subject matters and searches for keywords or phrases such as ATM, mortgage, overdraft, investment, advice, overdrawn, balance transfer, and others. Then, in as near real-time as possible, what is happening in any particular channel can be communicated across channels. Thus, next actions can be determined, for example, to initiate a chat online by human or virtual agent, to send marketing material, to recommend or conduct a branch visit, and/or to send materials in physical mail or email.

A client visiting a branch location of a service entity may be assisted or greeted by personnel informed of latest conversations, for example by way of notifications of or about the sent advisory messages being sent to each of the multiple SCS channels other than priority SCS channels.

Where a user has offered or entered information, that information is held and may be shared across multiple or all channels seamlessly for continuity as assistance transitions from virtual agent or human agent so agents joining or newly managing a communication need not ask and confirm and further inconvenience a client.

Next best actions may be conversations or other actions, such as product offerings or security alerts, as non-limiting examples. Next best action (NBA) automated prompting, such as by way of the advisory messages conveyed on SCS channels as described above, can utilize prioritization rules to determine what the next client conversation and/or action should be. Inputs would include propensity, attrition and likely-to-buy models as well as other data sources. For example, a client with increasing savings, and/or indicators of a growing number of family members, may be approaching house purchase condition, in which case a next best action may relate to offering mortgage loan services.

NBA automated prompting, such as by way of the advisory messages conveyed on SCS channels as described above assures users are contacted in a timely manner with respect to their journey, and for the right purpose to support client financial success.

NBA automated prompting enables client centric-prioritization over product-centric prioritization and ensures clients are provided with relevant messages and offers, which increases client responses and translates to a higher engagement with a service entity. Next best action determination and messaging capability implements hyper personalization, providing methodology and system technology to ensure clients are contacted at the right time for their personal or financial journey for the right purpose in the right service channel, and with client specific prioritization of what subjects are timely and relevant for client focused and client centric service.

Analytic techniques like linear regression can be utilized and/or sophisticated machine learning and AI techniques, within or using business rules and developed models to sift through communication and signals to make a prediction for a next best action.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A service system of a single service entity for monitoring signals in a service context specific (SCS) channel among multiple SCS channels and sending an advisory message when discharges are disproportionate with respect to a peer representative index (PRI), the service system comprising:

multiple system devices of the service system of the single service entity;

at least one processor;

a communication interface communicatively coupled to the at least one processor; and a memory device storing executable code, wherein, upon execution of the executable code by the at least one processor, the at least one processor is configured to, for each specific user of multiple users:

monitor signals in multiple bidirectional SCS channels among the multiple system devices of the service system of the single service entity and at least one user-specific device associated with the specific user, each SCS channel conveying signals to and from a respective system device, of the multiple system devices of the service system of the single service entity, associated with the SCS channel;

identify discharges of the specific user to at least one third party from an account associated with the user-specific device;

train via machine learning and using a set of training data an aggregating algorithm, the training data comprising identified discharges of the multiple users from a time period preceding a time interval, the training comprising iteratively predicting which of the multiple users to include in an aggregation of peer entities based on at least one cost category;

deploy the aggregating algorithm to generate a PRI of an aggregation of peer entities;

determine the discharges of the specific user during the time interval are disproportionate with respect to the PRI;

generate an advisory message regarding the disproportionate discharges for at least one SCS channel; and transmit over a network connection via the communication interface a signal conveying the advisory message via the at least one SCS channel to the user-specific device and the system device, of the multiple system devices of the service system of the single service entity, associated with the at least one SCS channel, wherein the advisory message automatically prompts the system device to initiate a chat online via the user-specific device.

2. The system of claim 1, wherein the system device communicates, via one or more of the SCS channel, with a user of the user-specific device via a virtual agent using conversational artificial intelligence (AI).

3. The system of claim 2, wherein the at least one processor executes a machine learning algorithm configured to guide, via the one or more SCS channel, dialog or actions during a phone call or a chat session with a user concerning a user matter via the virtual agent using the conversational artificial intelligence (AI).

4. The system according to claim 3, wherein the phone call or the chat session transpires between the user-specific device and the at least one system device over a network connection via the communication interface, wherein the user-specific device is one of a mobile phone, a non-mobile phone, a tablet device, a computer or a display screen with a virtual or physical keyboard.

5. The system according to claim 3, wherein the virtual agent conducts the phone call or a chat session with the user by steps including:

asking an initial question of the user and receiving a response from the user;

determining a next question to ask of the user or a next action to take based on the response; and connecting a human agent into the phone call or the chat session when connecting the human agent is determined as the next action.

6. The system of claim 1, wherein, via each of the multiple SCS channels, at least one system device communicates with a user of the at least one user-specific device via a respective human agent or virtual agent using conversational artificial intelligence (AI), and wherein the advisory message guides the human agent or virtual agent of the at least one SCS channel in a system-wide next dialog with the user.

7. The system according to claim 1, wherein the executable code, when executed, further causes the at least one processor to send at least a notification of the sent advisory message to each respective system device of the multiple SCS channels other than the at least one SCS channel.

8. The system according to claim 7, wherein sending at least the notification to each of the multiple SCS channels other than at least one SCS channel prevents repetitive dialogs with the user regarding a topic of the advisory message.

9. The system according to claim 1, wherein the bidirectional SCS channels conduct respective dialogs between at least one system device and at least one user device.

10. The system according to claim 1, wherein the respective dialogs are conducted, at least in part, non-concurrently, and at least some of the dialogs are conducted intermittently.

11. The system according to claim 10, wherein each dialog of the dialogs conducted intermittently is conducted via SMS, text, email, or app push notification.

12. A service system of a single service entity for monitoring signals in a service context specific (SCS) channel among multiple SCS channels and sending an advisory message when discharges are disproportionate with respect to a peer representative index (PRI), the system comprising:

multiple system devices of the service system of the single service entity;

at least one processor;

a communication interface communicatively coupled to the at least one processor; and a memory device storing executable code, wherein, upon execution of the executable code by the at least one processor, the at least one processor is configured to, for each specific user of multiple users:

monitor signals in multiple bidirectional SCS channels among the multiple system devices of the service system of the single service entity and at least one user-specific device associated with the specific user, each SCS channel conveying signals to and from a respective system device of the multiple system devices of the service system of the single service entity;

identify discharges of the specific user to at least one to a third party from an account associated with the user-specific device;

train via machine learning and using a set of training data an aggregating algorithm, the training data comprising identified discharges of the multiple users, the training comprising iteratively predicting which of the multiple users to include in an aggregation of peer entities based on at least one cost category;

deploy the aggregating algorithm to generate a PRI of an aggregation of peer entities;

determine the discharges of the specific user are disproportionate with respect to the PRI;

generate an advisory message regarding the disproportionate discharges for at least one SCS channel; and transmit over a network connection via the communication interface a signal conveying the advisory message via the at least one SCS channel to the user-specific device and the system device, of the multiple system devices of the service system of the single service entity, associated with the at least one SCS channel, wherein the advisory message automatically prompts the system device to initiate a chat online via the user-specific device, and wherein, via the at least one SCS channel, the system device communicates with a user of the user-specific device via a human agent or virtual agent using conversational artificial intelligence (AI), and wherein the advisory message guides at least one of the user and the human agent or virtual agent in a system-wide next dialog with the user.

13. The system according to claim 12, wherein the executable code, when executed, further causes the at least one processor to send at least a notification of the sent advisory message to each respective system device of the multiple SCS channels other than the at least one SCS channel.

14. The system according to claim 13, wherein sending at least the notification to each of the multiple SCS channels other than at least one SCS channel prevents repetitive dialogs with the user regarding a topic of the advisory message.

15. The system of claim 13, wherein the at least one processor executes a machine learning algorithm configured to guide, via the at least one SCS channel, dialog or actions during a phone call or a chat session with a user concerning a user matter via the virtual agent using the conversational artificial intelligence (AI).

16. The system according to claim 15, wherein the phone call or the chat session transpires between the user-specific device and the at least one system device over a network connection via the communication interface, wherein the user-specific device is one of a mobile phone, a non-mobile phone, a tablet device, a computer or a display screen with a virtual or physical keyboard.

17. The system according to claim 15, wherein the virtual agent conducts the phone call or a chat session with the user by steps including:

asking an initial question of the user and receiving a response from the user;

determining a next question to ask of the user or a next action to take based on the response; and connecting a human agent into the phone call or the chat session when connecting the human agent is determined as the next action.

18. A method for monitoring, by a computing system of a single service entity, signals in a service context specific (SCS) channel among multiple SCS channels and sending an advisory message when discharges are disproportionate with respect to peer representative index (PRI), the computing system comprising multiple system devices of the single service entity; at least one processor, a communication interface communicatively coupled to the at least one processor, and a memory device storing computer-readable instructions, the at least one processor configured to execute the computer-readable instructions, the method comprising, upon execution of the computer-readable instructions by the at least one processor for each specific user of multiple users:

monitoring signals in multiple bidirectional SCS channels among the multiple system devices of the service system of the single service entity and at least one user-specific device associated with the specific user, each SCS channel conveying signals to and from a respective system device of the multiple system devices of the service system of the single service entity;

identifying discharges of the specific user to at least one third party from an account associated with the user-specific device;

training via machine learning and using a set of training data an aggregating algorithm, the training data comprising identified discharges of the multiple users from a time period preceding a time interval, the training comprising iteratively predicting which of the multiple users to include in an aggregation of peer entities based on at least one cost category;

deploying the aggregating algorithm to generate a PRI of an aggregation of peer entities;

determining the discharges of the specific user during the time interval are disproportionate with respect to the PRI;

generating an advisory message regarding the disproportionate discharges for at least one SCS channel; and transmitting over a network connection via the communication interface a signal conveying the advisory message via the at least one SCS channel to the user-specific device and the system device, of the multiple system devices of the service system of the single service entity, associated with the at least one SCS channel, wherein the advisory message automatically prompts the system device to initiate a chat online via the user-specific device.

19. The method according to claim 18, further comprising sending at least a notification of the sent advisory message to each respective system device of the multiple SCS channels other than the at least one SCS channel.

20. The method according to claim 19, further comprising sending at least the notification to each respective system device of the multiple SCS channels other than the at least one SCS channel prevents repetitive dialogs with the user regarding the disproportionate discharges.

* * * * *